(12) United States Patent
Kirchberger et al.

(10) Patent No.: US 6,304,807 B1
(45) Date of Patent: Oct. 16, 2001

(54) METHOD FOR DETERMINING THE YAW VELOCITY OF A VEHICLE

(75) Inventors: Andreas Kirchberger, Sinzing; Reiner Hoppstock, München, both of (DE)

(73) Assignee: Siemens Aktiengesellschaft AG, Munich (DE)

( * ) Notice: Subject to any disclaimer, the term of this patent is extended or adjusted under 35 U.S.C. 154(b) by 0 days.

(21) Appl. No.: 09/096,977

(22) Filed: Jun. 12, 1998

(30) Foreign Application Priority Data

Jun. 12, 1997 (DE) .............................................. 197 24 955

(51) Int. Cl.[7] ....................................................... G06G 7/76
(52) U.S. Cl. ................................................. 701/72; 709/79
(58) Field of Search .................................. 701/79, 74, 72, 701/91, 93, 75; 303/46, 147

(56) References Cited

U.S. PATENT DOCUMENTS

| | | | |
|---|---|---|---|
| 4,042,059 | * | 8/1977 | Bertolasi ........................... 180/103 R |
| 5,190,111 | * | 3/1993 | Young et al. .............................. 172/7 |
| 5,456,641 | * | 10/1995 | Sawase .................................... 475/86 |
| 5,479,811 | * | 1/1996 | Baumann et al. ........................... 73/2 |
| 5,670,716 | * | 9/1997 | Tamasho et al. .................... 73/146.2 |
| 5,725,067 | * | 3/1998 | Ikeda et al. ........................... 180/197 |
| 5,857,160 | * | 1/1999 | Dickinson et al. ..................... 701/41 |
| 5,857,754 | * | 1/1999 | Fukami et al. ........................ 303/146 |

FOREIGN PATENT DOCUMENTS 44 36 162 C 1   3/1996   (DE) .

OTHER PUBLICATIONS

Japanese Patent Abstract No. 07291154 A (Tsukasa), dated Nov. 7, 1995.

* cited by examiner

*Primary Examiner*—William A. Cuchlinski, Jr.
*Assistant Examiner*—Marhe Y. Marc-Coleman
(74) *Attorney, Agent, or Firm*—Herbert L. Lerner; Laurence A. Greenberg; Werner H. Stemer

(57) ABSTRACT

A method for determining the yaw velocity of a vehicle is used, in particular, for adaptive driving-speed control. The yaw velocity is calculated from measurements of wheel speed determined by wheel-speed sensors on a right and on a left non-driven wheel by introducing a correction term with a correction factor with which differing tire wear as well as different tire pressure and other interfering parameters can be eliminated.

6 Claims, 2 Drawing Sheets

METHOD FOR DETERMINING THE YAW VELOCITY OF A VEHICLE

BACKGROUND OF THE INVENTION

1 Field of the Invention

The invention relates to a method for determining the yaw velocity of a vehicle, in particular for adaptive driving-speed control, from wheel speeds measured by wheel-speed sensors on a right and a left non-driven wheel, wherein the yaw velocity of the vehicle is determined from a comparison of the measurements of the right wheel speed and the left wheel speed.

A system for controlling the driving stability of a motor vehicle is known from German Patent DE 44 36 162 C1, corresponding to U.S. patent application Ser. No. 08/837,241, filed Apr. 10, 1997. In that system, a control device is supplied not only with the wheel speeds measured by sensors, in order to control the brake pressure applied to the individual wheels on the basis thereof, but the control device also receives further signals from a steering-angle sensor and a yaw-velocity sensor, in order to keep the driving condition of the motor vehicle stable. In that context, it is also known to determine the yaw velocity, that is to say the rotation of the vehicle about the vertical axis, not in a sensor but instead by computation and specifically, for example, from the wheel speeds of the two front or rear wheels, or from the steering-wheel angle and a wheel speed.

Mathematical derivations for the steering-wheel angle, the yaw velocity and further functions in the case of driving a vehicle steadily in a circle at a constant radius with a constant driving speed are presented in a publication entitled "Dynamik der Kraftfahrzeuge"[Motor Vehicle Dynamics] by M. Mitschke, Vol. C, Fahrverhalten [Handling], 2nd Ed., Springer-Verlag, pp. 31–39. The functions are determined on one hand from vehicle data, such as mass m and wheelbase, l and on the other hand from steering data, such as steering angle and steering ratio. Those derivations also disclose the combination of a series of vehicle and steering data into a "characteristic driving speed" $v_{ch}$. It is often not possible to determine the yaw velocity with the high accuracy often desired by using the equations given in the literature. Indeed, the tire pressure as well as the tire wear may vary on the different wheels. Furthermore, the handling may be affected by crosswind and by steering-angle corrections, for example in the case of a cambered road.

If it is desired to determine even low yaw velocities with high accuracy, then that is usually performed with yaw-velocity sensors as have been developed for aircraft navigation. Sensors of that type are expensive and are also sensitive to temperature, usually exhibiting a temperature drift of up to 1°/s.

SUMMARY OF THE INVENTION

It is accordingly an object of the invention to provide a method for determining the yaw velocity of a vehicle, which overcomes the hereinafore-mentioned disadvantages of the heretofore-known methods of this general type and which calculates the yaw velocity of a vehicle with high accuracy from wheel speeds.

With the foregoing and other objects in view there is provided, in accordance with the invention, a method for determining a yaw velocity of a vehicle, in particular for an adaptive driving-speed control, which comprises measuring wheel speeds with wheel-speed sensors on a right and a left non-driven wheel; determining a yaw velocity of the vehicle from a comparison of the measurements of the right wheel speed $v_r$ and the left wheel speed $v_l$; and correcting the wheel speeds $v_r$ and $v_l$ by calculating a correction factor $q=v_{rs}/v_{ls}$ when the vehicle is driving in a straight line and using the correction factor q to correct a ratio $v_r/v_l$ between the right and left wheel speeds, where $v_{rs}$ and $v_{ls}$ are the wheel speeds when driving in a straight line.

According to the invention, the wheel speeds measured by wheel-speed sensors for the two monitored unpowered or non-driven driven wheels, that is to say the left and right front wheels in the case of rear-wheel drive, are corrected by a correction factor which is determined when the vehicle is driving in a straight line and which is therefore capable of eliminating different tire pressures, different tire wear, steering angle due to a cambered road, crosswind and other factors. The yaw velocity can therefore be calculated very accurately.

With the method according to the invention, it is advantageously possible to carry out adaptive driving-speed control. In this case, a distance sensor determines the speed and the distance of a vehicle from the vehicle driving in front. In order to establish whether or not another vehicle is in one's own lane, that is to say in conjunction with passing maneuvers and lane changing, lane prediction must be carried out. For that purpose it is necessary to have the yaw velocity of one's own vehicle. In order to achieve good lane prediction, the yaw velocity must be determined to about +/−0.2°/s, since under normal driving conditions on the highway, only small yaw velocities of from +5°/s to −5/s occur, and the maximum is about +/−20°/s.

In this context, the invention provides a cost-efficient solution, since the wheel-speed sensors which are in any case provided for antilock protection deliver the measurements for calculating the yaw velocity and the correction factor.

In accordance with another mode of the invention, there is provided a method which comprises calculating the yaw velocity as a function of the determined wheel speed v and a characteristic driving speed $v_{ch}$ from a ratio $v/(1+(v/(v_{ch}))^2)$, and multiplying the ratio by a correction term $(v_r/v_l-q)/(v_r/v_l+q)$ In accordance with a further mode of the invention, there is provided a method which comprises determining the correction factor q when a particular driving speed is exceeded and for a steering angle of approximately zero.

In accordance with an added mode of the invention, there is provided a method which comprises filtering the correction factor q with a low-pass filter.

In accordance with a concomitant mode of the invention, there is provided a method which comprises continuously determining a difference in the yaw velocity due to a steering angle and due to the wheel speeds, and when the difference exceeds a predetermined amount, following up the correction factor q by shortening a time constant of the low-pass filter before increasing it again slowly to a maximum value after a new correction factor has been determined.

Other features which are considered as characteristic for the invention are set forth in the appended claims.

Although the invention is illustrated and described herein as embodied in a method for determining the yaw velocity of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
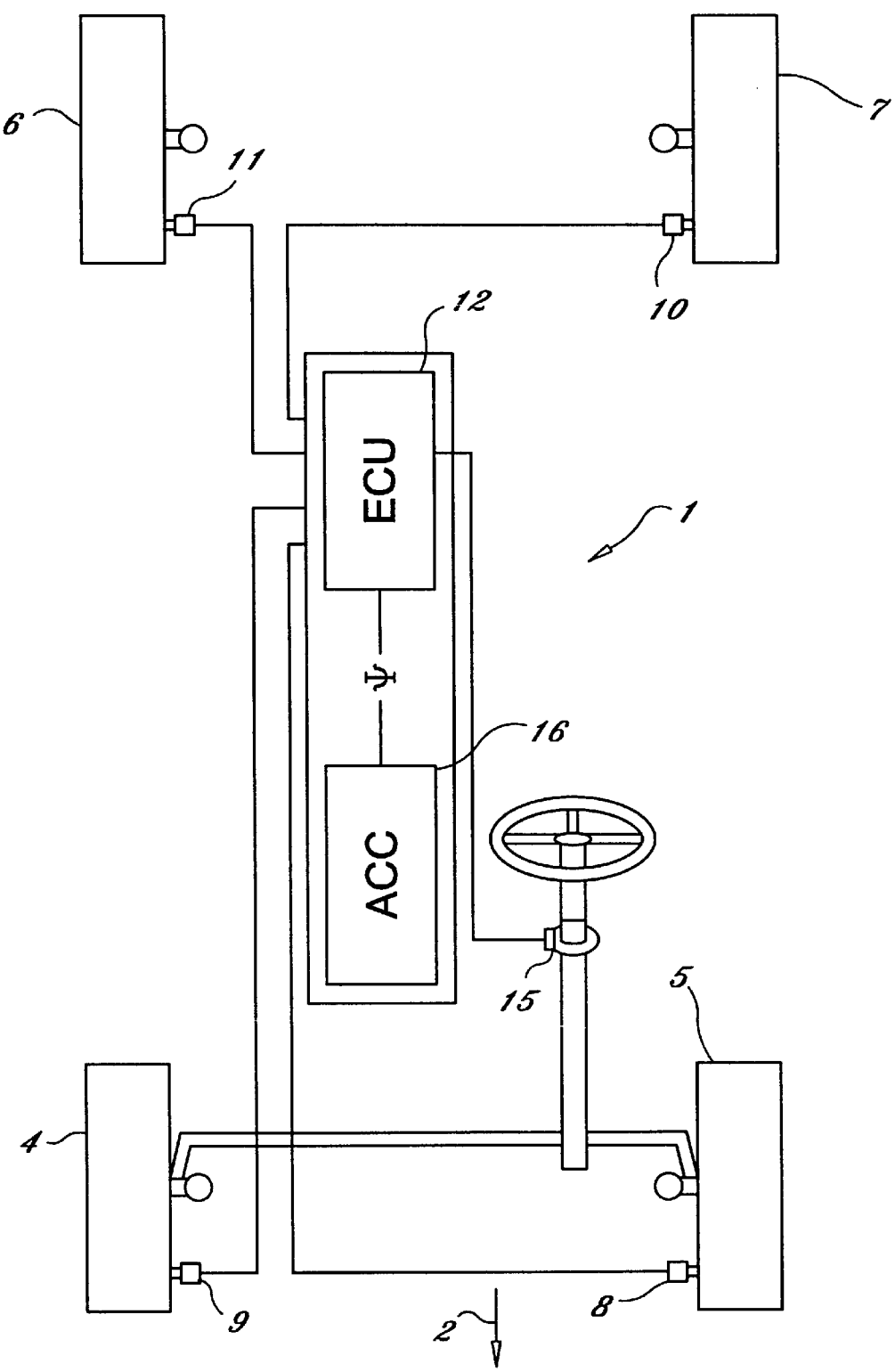
FIG. 1 in a schematic and diagrammatic representation of a motor vehicle with adaptive driving-speed control.

DESCRIPTION OF THE PREFERRED EMBODIMENTS:

Referring now in detail to FIG. 1 of the drawings, there is seen a motor vehicle 1 having a driving direction indicated by all arrow 2 and having four wheels 4, 5, 6 and 7. Each wheel is assigned a wheel-speed sensor 8 (left front), 9 (right front), 10 (left rear) and 11 (right rear). Signals delivered by these sensors are sent along signal lines which can be seen in the drawing to a control device 12, where they are evaluated. The control device 12 produces control signals, with which brake pressure applied to the individual wheels in controlled. The control device may be constructed as an anti-lock brake system (ABS) or in combination with a drive-slip control system (DCS). Various embodiments of such systems are known (for example from German Patent DE 44 36 162 C1, filed Apr. 10, 1997). The control device 12 is furthermore supplied with a steering-wheel angle, which is measured by a sensor 15.

An adaptive driving-speed controller 16 is also connected to the control device 12. This controller 16 serves to evaluate the yaw velocity of the vehicle in order to detect which lane the vehicle is in, or if the intention is to change lanes.

Figure 2:
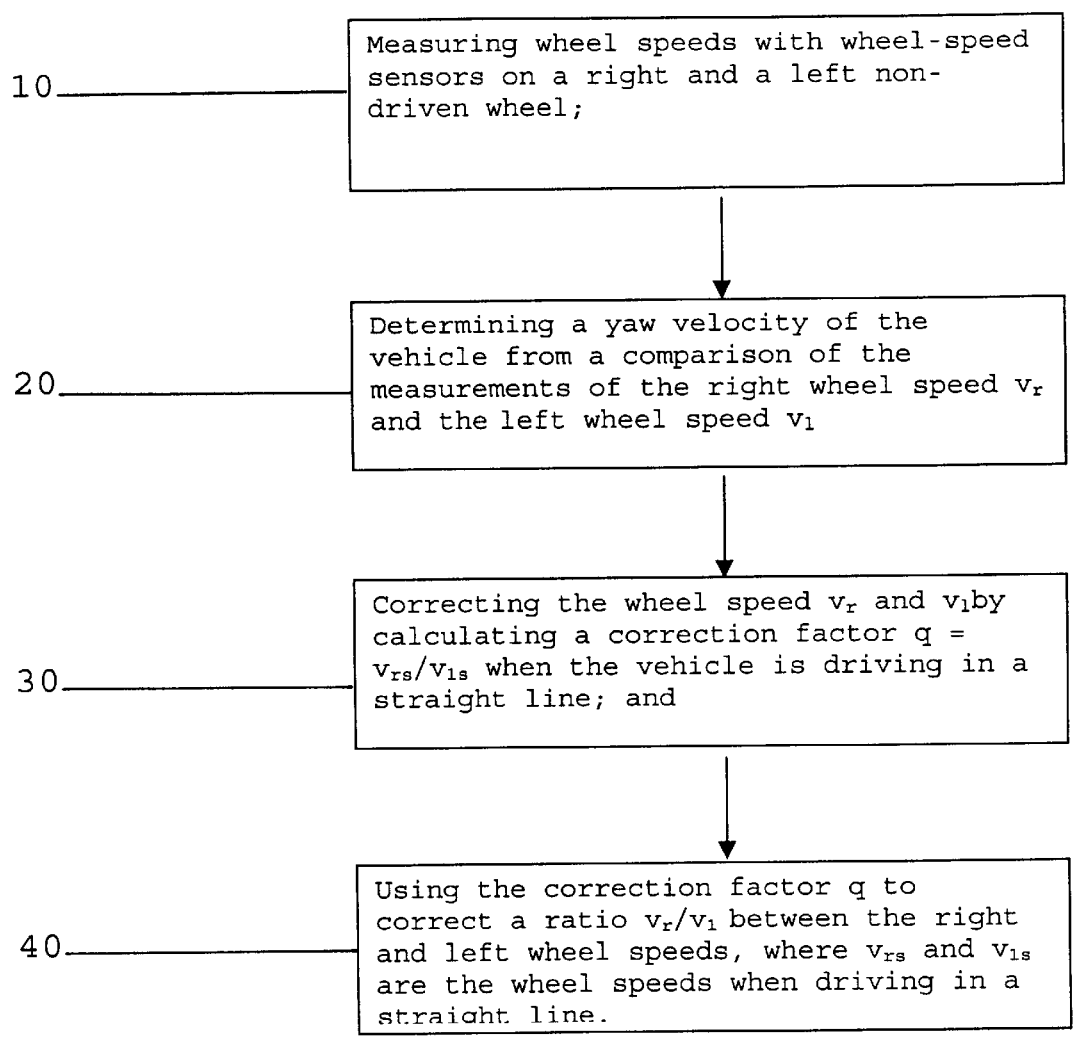
FIG. 2 is a flow chart illustrating the method for determining a yaw velocity of a vehicle.

FIG. 2 is a flow chart showing the following steps. In step 10, the wheel speeds is measured with wheel-speed sensor on the right and the left non-driven wheel. In step 20, a yaw velocity of the vehicle is determined from a comparison of the measurements of the right wheel speed $v_r$ and the left wheel speed $v_l$. In step 30, the wheel speeds $v_r$ and $v_l$ are corrected by calculating a correction factor $q=v_{rc}/v_{lc}$ when the vehicle is driving in a straight line. In step 40, the correction factor q is used to correct a ratio $v_r/v_l$ between the right and left wheel speeds, where $v_{rs}$ and $v_{1s}$ are the wheel speeds when driving in a straight line.

The following equation is applied for calculating the yaw velocity from the wheel-speed signals:

$$g_{ABS} = \frac{2*v*\left(\frac{v_r}{v_l}-q\right)}{l_{TW}*\left(\frac{v_r}{v_l}+q\right)*\left(l+\left(\frac{v}{v_{chABS}}\right)^2\right)}$$

wherein:

$g_{ABS}$: yaw velocity from ABS signals (wheel speeds)
$I_{TW}$: track width of the front axle
$V_{chABS}$: characteristic velocity (ABS signals)

$$v = \frac{v_l + v_r}{2}$$

v: speed
$v_1$: speed of left front wheel (unpowered or non-driven)
$v_r$: speed of right front wheel (unpowered or non-driven)
q: a correction factor $$q = \frac{v_{rs}}{v_{ls}}$$

wherein $v_{rs}$ and $v_{ls}$ are the speed of the front wheels when driving in a straight line.

It can be seen from the first equation that a ratio $$\frac{v}{1+\left(\frac{v}{v_{CH_{ABS}}}\right)}$$

for the velocity is multiplied by a correction term $(v_r/v_l-q)/(v_r/v_l+q)$. The correction term is thus formed of the ratio between the wheel speeds for the right and left front wheels+/−the correction factor q, which is determined as the ratio between the speeds of the two front wheels when driving in a straight line. With this correction term, the accuracy for determining the yaw velocity of the vehicle is substantially increased according to the invention, and is on the order of +/−0.20°/s.

The correction factor is determined only when driving in a straight line. The driving of the vehicle in a straight line is detected when the driving speed is above a predetermined value and the yaw velocity is zero or is in a very narrow window around the zero setting. The steering-angle sensor 15 is provided for this purpose. The correction factor q is filtered by a low-pass filter in order to eliminate short-term changes in the correction factor due to varying road conditions or the like. The filtering time of the low-pass filter thus adapts to the quality of the determined correction factor.

The correction factor which is determined and filtered in this way is monitored continuously in order to establish whether the correction factor is still valid or whether it has changed, for example when a tire has been replaced. The monitoring of the correction factor takes place from a comparison of the yaw velocity determined on the basis of the wheel-speed signals, and the yaw velocity determined from a measurement of the steering angle according to the following equation:

$$g_s = \frac{\delta_s * v}{i*l*\left(1+\left(\frac{v}{v_{chS}}\right)^2\right)}$$

wherein $g_S$: yaw velocity from the steering angle
$\delta_S$: steering angle
i: steering ratio
l: wheelbase
$V_{chS}$: characteristic velocity (steering angle)
v: averaged speed as in the first equation The difference between the two yaw velocities which are calculated in this way is observed over a set period of time. If the difference exceeds a specific value, then this is an indication that the correction factor needs to be followed up. In order to do this, the filtering time of the low-pass filter is shortened, in order to obtain a new correction factor q, and then increase it again slowly up to the maximum value.

We claim:

1. A method for determining a yaw Velocity of a vehicle, which comprises:

measuring wheel speeds with wheel-speed sensors on a right and a left non-driven wheel;

determining a yaw velocity of the vehicle from a comparison of the measurements of the right wheel speed $v_r$ and the left wheel speed $v_l$; and correcting the wheel speeds $v_r$ and $v_l$ by calculating a correction factor $q=v_{rs}/v_{ls}$ when the vehicle is driving in a straight line and using the correction factor q to correct a ratio $v_r/v_l$ between the right and left wheel speeds, where $v_{rs}$ and $v_{ls}$ are the wheel speeds when driving in a straight line.

2. The method according to claim 1, which comprises calculating the yaw velocity as a function of the determined wheel speed v and a characteristic driving speed $v_{ch}$ from a ratio and multiplying the ratio by a correction term $((v_r/v_l)-q/((v_r/v_l)=q)$.

3. The method according to claim 1, which comprises determining the correction factor q when a particular driving speed is exceeded and for a steering angle of approximately zero.

4. The method according to claim 1, which comprises filtering the correction factor q with a low-pass filter.

5. The method according to claim 4, which comprises continuously determining a difference in the yaw velocity due to a steering angle and due to the wheel speeds, and when the difference exceeds a predetermined amount, following up the correction factor q by shortening a time constant of the low-pass pass filter before increasing it again slowly to a maximum value after a new correction factor has been determined.

6. The method according to claim 1, which comprises carrying out an adaptive driving-speed control with the determined yaw velocity.

\* \* \* \* \*